US011199156B2

(12) United States Patent
Oshima et al.

(10) Patent No.: US 11,199,156 B2
(45) Date of Patent: Dec. 14, 2021

(54) BEARING CAP, INTERNAL COMBUSTION ENGINE, AND MANUFACTURING METHOD OF INTERNAL COMBUSTION ENGINE

(71) Applicant: TOYOTA JIDOSHA KABUSHIKI KAISHA, Aichi-ken (JP)

(72) Inventors: Tomoya Oshima, Toyota (JP); Ken Yamada, Nishio (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 17/013,655

(22) Filed: Sep. 7, 2020

(65) Prior Publication Data

US 2021/0131377 A1 May 6, 2021

(30) Foreign Application Priority Data

Nov. 1, 2019 (JP) .............................. JP2019-199684

(51) Int. Cl.
*F02F 7/00* (2006.01)
*F16C 9/00* (2006.01)

(52) U.S. Cl.
CPC .............. *F02F 7/0043* (2013.01); *F16C 9/00* (2013.01)

(58) Field of Classification Search
CPC .................................. F02F 7/0043; F16C 9/00
See application file for complete search history.

(56) References Cited

U.S. PATENT DOCUMENTS

| 6,205,970 | B1 | 3/2001 | Iwata et al. | |
|---|---|---|---|---|
| 7,047,927 | B2* | 5/2006 | Hashimoto | F01M 1/02 123/192.2 |
| 8,690,440 | B2* | 4/2014 | Mochida | F16C 9/02 384/432 |
| 2013/0170774 | A1 | 7/2013 | Mochida | |
| 2014/0026841 | A1* | 1/2014 | Jones | F02F 1/108 123/195 R |

FOREIGN PATENT DOCUMENTS

| JP | 20059447 A | | 1/2005 |
|---|---|---|---|
| JP | 4072251 B2 | | 4/2008 |
| JP | 2008256161 A | | 10/2008 |
| JP | 2009180210 A | * | 8/2009 |
| WO | 2012032888 A1 | | 3/2012 |

* cited by examiner

*Primary Examiner* — Jacob M Amick
*Assistant Examiner* — Charles J Brauch
(74) *Attorney, Agent, or Firm* — Hauptman Ham, LLP

(57) ABSTRACT

A bearing cap according to one embodiment of this disclosure includes: a concave part that supports a crankshaft of an internal combustion engine; first bosses that are disposed one on each side of the concave part and each have a first bolt hole; and second bosses that are disposed one on each side of a bearing cap main body having the concave part and the first bosses so as to flank the bearing cap main body and each have a second bolt hole. The bearing cap is fixed to a first member of the internal combustion engine by first bolts inserted into the first bolt holes, and to a second member of the internal combustion engine by second bolts inserted into the second bolt holes. At least the pair of second bosses have higher rigidity than a frame.

21 Claims, 3 Drawing Sheets

BEARING CAP, INTERNAL COMBUSTION ENGINE, AND MANUFACTURING METHOD OF INTERNAL COMBUSTION ENGINE

INCORPORATION BY REFERENCE

The disclosure of Japanese Patent Application No. 2019-199684 filed on Nov. 1, 2019 including the specification, drawings and abstract is incorporated herein by reference in its entirety.

BACKGROUND

1. Technical Field

This disclosure relates to a bearing cap, an internal combustion engine, and a manufacturing method of an internal combustion engine.

2. Description of Related Art

Some internal combustion engines, such as automotive engines, are equipped with a device called a balancer or the like. For example, the internal combustion engine of Japanese Patent Application Publication No. 2008-256161 (JP 2008-256161 A) has a configuration in which internal threads are formed in a first member of the internal combustion engine and a second member, such as a housing of the aforementioned device, is fixed to the first member by bolts screwed on the internal threads.

SUMMARY

The present applicant found the following problem. Since members of an internal combustion engine are generally made of aluminum material, bolts screwed into the members may loosen or internal threads formed in the members may crack. Thus, the second member may not be securely supported in the internal combustion engine of JP 2008-256161 A.

Having been contrived in view of the above problem, this disclosure provides a bearing cap that can securely support a member, such as a housing, an internal combustion engine, and a manufacturing method of an internal combustion engine.

A bearing cap according to one aspect of the disclosure is a bearing cap that is cast in a frame of an internal combustion engine. This bearing cap includes: a concave part that supports a crankshaft of the internal combustion engine; a pair of first bosses that are disposed one on each side of the concave part so as to flank the concave part and each have a first bolt hole; and a pair of second bosses that are disposed one on each side of a bearing cap main body having the concave part and the pair of first bosses so as to flank the bearing cap main body and each have a second bolt hole. The bearing cap is fixed to a first member of the internal combustion engine by first bolts inserted into the first bolt holes, and to a second member of the internal combustion engine by second bolts inserted into the second bolt holes. At least the pair of second bosses have higher rigidity than the frame.

Since at least the second bosses have higher rigidity than the frame, this configuration can reduce the likelihood of the second bolts loosening or the second bosses cracking when the second bolts are fastened to the second bolt holes. Therefore, the second member can be securely supported.

In the above bearing cap, the first member may be a cylinder block of the internal combustion engine, and the second member may be a balancer housing of the internal combustion engine.

In the above bearing cap, the first bolt holes may have a longer axial length than the second bolt holes.

In the above bearing cap, the first bolt holes in the first bosses may have a longer axial length than the second bolt holes in the second bosses.

This configuration can reduce the size and weight of the bearing cap.

An internal combustion engine according to one aspect of the disclosure is an internal combustion engine including a first member, a second member, a frame, a crankshaft, and a bearing cap that is cast in the frame and supports the crankshaft. The bearing cap includes: a concave part that supports the crankshaft; a pair of first bosses that are disposed one on each side of the concave part so as to flank the concave part and each have a first bolt hole; and a pair of second bosses that are disposed one on each side of a bearing cap main body having the concave part and the pair of first bosses so as to flank the bearing cap main body and each have a second bolt hole. The bearing cap is fixed to the first member of the internal combustion engine by first bolts inserted into the first bolt holes, and to the second member of the internal combustion engine by second bolts inserted into the second bolt holes. At least the pair of second bosses have higher rigidity than the frame.

Since at least the second bosses have higher rigidity than the frame, this configuration can reduce the likelihood of the second bolts loosening or the second bosses cracking when the second bolts are fastened to the second bolt holes. Therefore, the second member can be securely supported.

A manufacturing method of an internal combustion engine according to one aspect of the disclosure is a manufacturing method of an internal combustion engine including a first member, a second member, a frame, a crankshaft, and a bearing cap that supports the crankshaft. This manufacturing method includes the steps of: casting, in the frame, a bearing cap including a bearing cap main body having a concave part that supports the crankshaft and a pair of first bosses that are disposed one on each side of the concave part so as to flank the concave part, and a pair of second bosses that are disposed one on each side of the bearing cap main body so as to flank the bearing cap main body, at least the second bosses having higher rigidity than the frame; fixing the bearing cap cast in the frame to the first member by first bolts inserted into first bolt holes that are formed in the first bosses of the bearing cap; and fixing the bearing cap cast in the frame to the second member by second bolts inserted into second bolt holes that are formed in the second bosses of the bearing cap.

Since at least the second bosses have higher rigidity than the frame, the likelihood of the second bolts loosening or the second bosses cracking when the second bolts are fastened to the second bolt holes can be reduced. Therefore, the second member can be securely supported.

This disclosure can provide a bearing cap that can securely support a member, such as a housing, an internal combustion engine, and a manufacturing method of an internal combustion engine.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A specific embodiment to which this disclosure is applied will be described in detail below with reference to the drawings. However, the disclosure is not limited to the following embodiment. To clarify the illustration, the following description and drawings are simplified as necessary.

Figure 1:
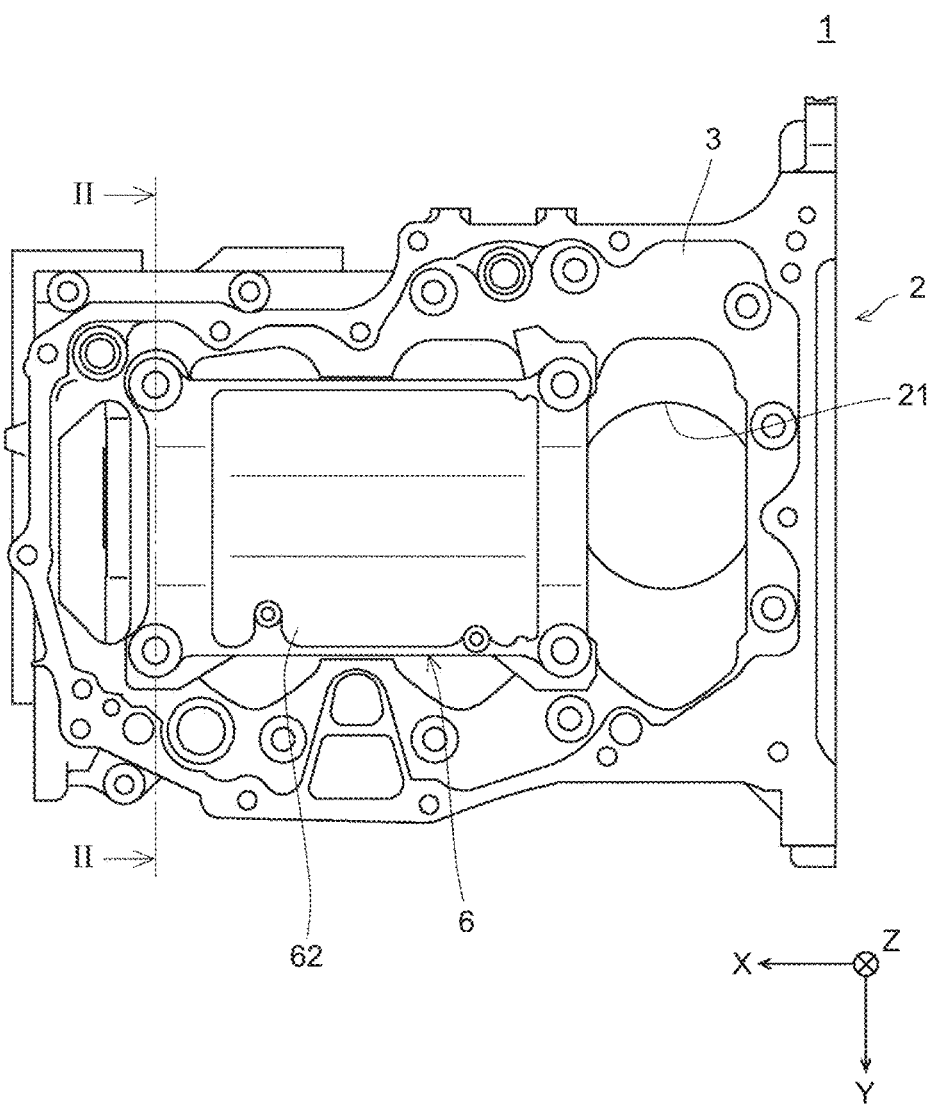
FIG. 1 is a bottom view showing an internal combustion engine of an embodiment.
Figure 2:
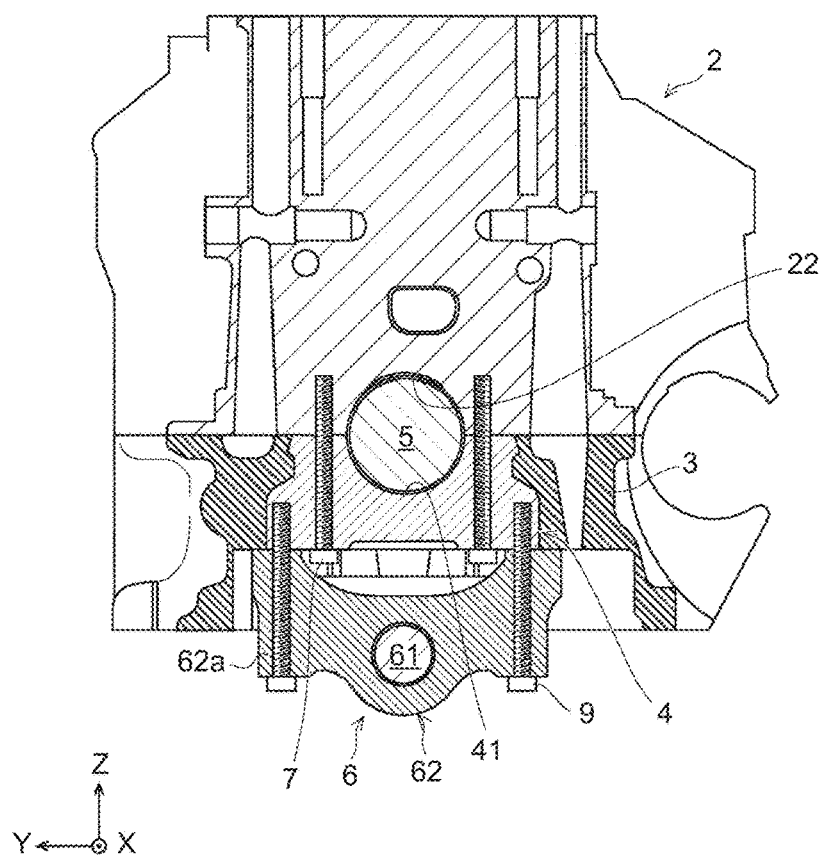
FIG. 2 is a view of section II-II of FIG. 1.

First, the basic configuration of an internal combustion engine of the embodiment will be described. FIG. 1 is a bottom view showing the internal combustion engine of the embodiment. FIG. 2 is a view of section II-II of FIG. 1. In FIG. 1 and FIG. 2, a crank case, an oil pan, etc. are omitted to clarify the relationship among a cylinder block, a bearing cap, a frame, and a balancer housing. In addition, each member is shown as simplified.

To clarify the illustration, a three-dimensional (XYZ) coordinate system will be used in the following description. In this coordinate system, the X-axis is an axis parallel to a central axis of the crankshaft; the Z-axis is an axis parallel to a central axis of a cylinder of the cylinder block; and the Y-axis is an axis orthogonal to the X-axis and the Z-axis.

As shown in FIG. 1 and FIG. 2, the internal combustion engine 1 includes a cylinder block 2, a frame 3, a bearing cap 4, a crankshaft 5, and a balancer 6. The cylinder block 2 is a cast part made of aluminum material and, as shown in FIG. 1, for example, includes a plurality of cylinders 21 that extends in a Z-axis direction. In a surface of the cylinder block 2 on a Z-axis minus side, the cylinder block 2 has a concave part 22 having a semicircular arc shape corresponding to the circumferential shape of the crankshaft 5.

The frame 3 is a cast part made of aluminum material. The frame 3 has, for example, a ladder shape and is fixed to the cylinder block 2 by the bearing cap 4. The frame 3 may have any shape that allows the crankshaft 5 to be supported by the bearing cap 4 as will be described later. The crank case and the oil pan omitted from FIG. 1 and FIG. 2 are disposed and fixed on the Z-axis minus side of the frame 3.

As will be described in detail later, the bearing cap 4 is cast in the frame 3, and in a surface of the bearing cap 4 on a Z-axis plus side, the bearing cap 4 has a concave part 41 having a semicircular arc shape corresponding to the circumferential shape of the crankshaft 5. The bearing cap 4 is fixed to the cylinder block 2 by bolts 7. The crankshaft 5 extends in an X-axis direction, and is disposed in a space formed by the concave part 22 of the cylinder block 2 and the concave part 41 of the bearing cap 4 through a bearing (not shown).

The balancer 6 reduces vibration due to rotation of the crankshaft 5 etc. The balancer 6 includes a balancer shaft 61 to which a rotational driving force is transmitted from the crankshaft 5, and a balancer housing 62 that supports the balancer shaft 61. The balancer housing 62 is fixed to the bearing cap 4 by bolts 9.

Figure 3:
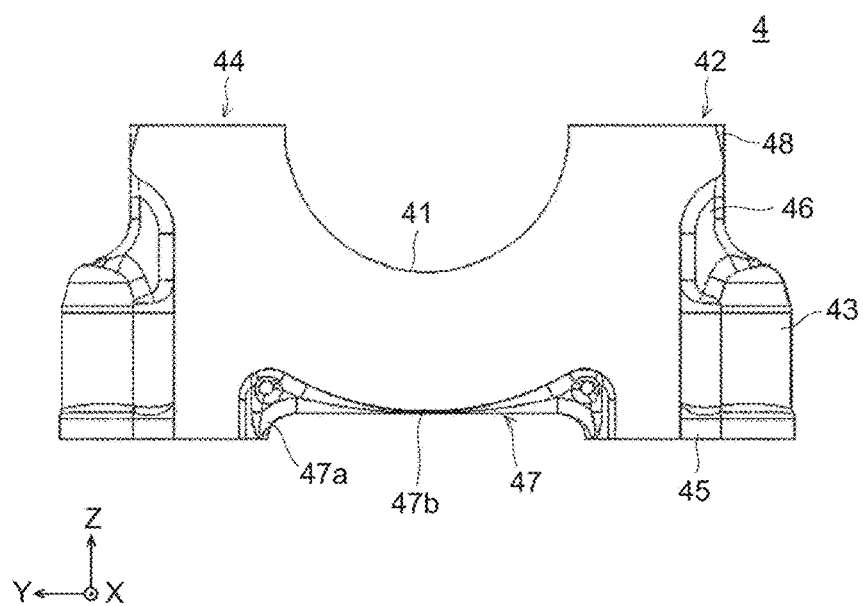
FIG. 3 is a front view showing a bearing cap of the embodiment.
Figure 4:
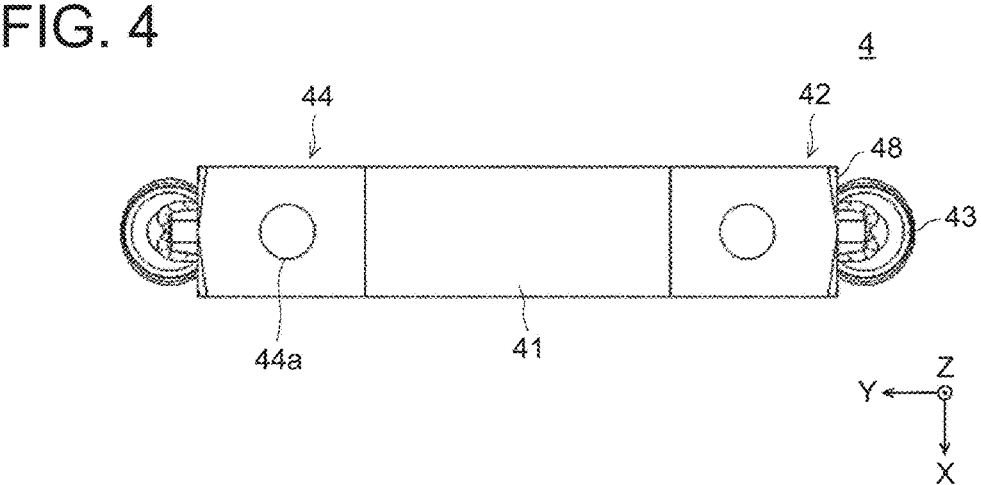
FIG. 4 is a plan view showing the bearing cap of the embodiment.
Figure 5:
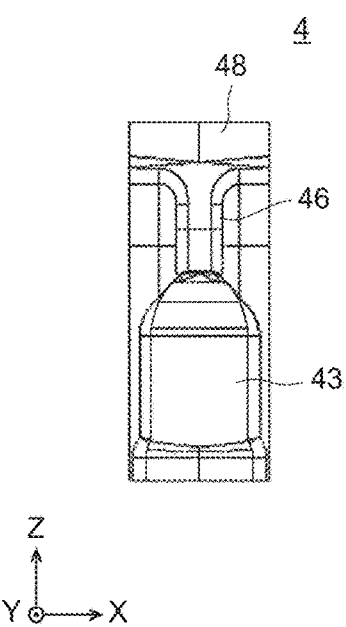
FIG. 5 is a side view showing the bearing cap of the embodiment.
Figure 6:
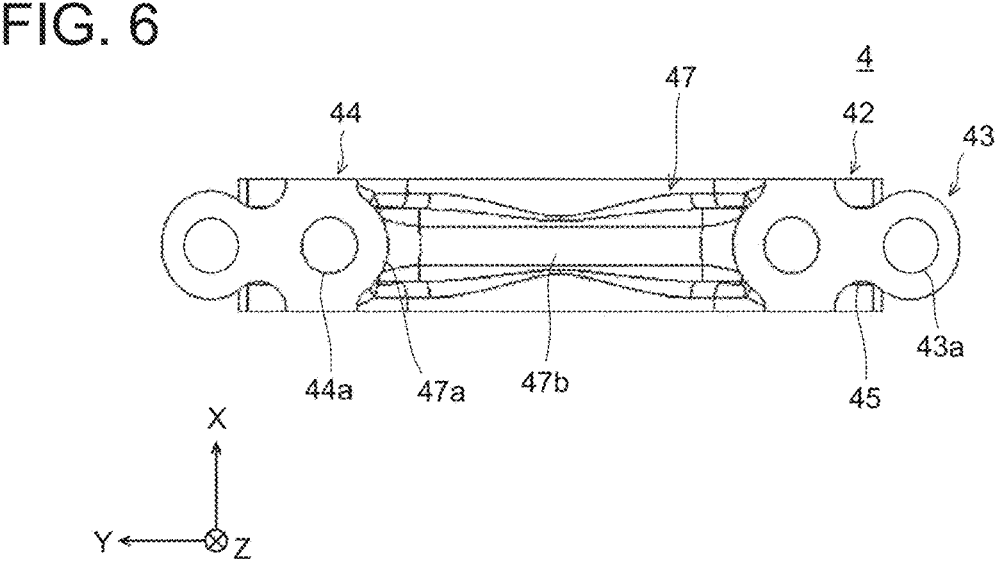
FIG. 6 is a bottom view showing a bearing cap of the embodiment.

Next, the configuration of the bearing cap 4 of the embodiment will be described. FIG. 3 is a front view showing the bearing cap of the embodiment. FIG. 4 is a plan view showing the bearing cap of the embodiment. FIG. 5 is a side view showing the bearing cap of the embodiment. FIG. 6 is a bottom view showing the bearing cap of the embodiment.

As shown in FIG. 3 to FIG. 6, the bearing cap 4 of the embodiment includes a bearing cap main body 42, and a pair of second bosses 43 that flank the bearing cap main body 42 and protrude outward in a Y-axis direction from the bearing cap main body 42.

The bearing cap main body 42 has, for example, a plate shape having thickness in an X-axis direction as a basic form, and includes the concave part 41 and a pair of first bosses 44. The concave part 41 supports the crankshaft 5 as mentioned above. Specifically, as seen from the X-axis direction, the concave part 41 has a substantially semicircular arc shape that corresponds to the circumferential shape of the crankshaft 5. The concave part 41 is formed in a surface of the bearing cap main body 42 on the Z-axis plus side and extends in the X-axis direction. The concave part 41 is disposed, for example, roughly at the center of the bearing cap main body 42 in the Y-axis direction.

As shown in FIG. 4, the first bosses 44 are disposed one on each side of the concave part 41 in the Y-axis direction so as to flank the concave part 41, and each have a first bolt hole 44a that extends through the bearing cap main body 42 in the Z-axis direction. Thus, the first bolt holes 44a are disposed one on each side of the concave part 41 in the Y-axis direction so as to flank the concave part 41. An internal thread may or may not be formed in circumferential surfaces of the first bolt holes 44a. It is preferable that surfaces of the first bosses 44 on the Z-axis plus side and the Z-axis minus side be substantially flat surfaces.

As shown in FIG. 6, the second bosses 43 are formed integrally with the bearing cap main body 42 and each have a second bolt hole 43a. The second bolt hole 43a extends in the Z-axis direction, and an end of the second bolt hole 43a on the Z-axis minus side reaches a surface of the second boss 43 on the Z-axis minus side. An internal thread is formed in a circumferential surface of the second bolt hole 43a. It is preferable that the surface of the second boss 43 on the Z-axis minus side be, for example, a substantially flat surface and disposed substantially flush with the surface of the first boss 44 on the Z-axis minus side.

The bearing cap 4 is configured such that at least the second bosses 43 have higher rigidity than the frame 3. This configuration in which at least the second bosses 43 have higher rigidity than the frame 3 can be realized, for example, by using iron as the material of the bearing cap 4 such that the bearing cap 4 has higher rigidity than the frame 3. However, the means is not limited as long as the configuration in which at least the second bosses 43 have higher rigidity than the frame 3 can be realized; for example, the bearing cap main body 42 and the second bosses 43 may be made of different materials.

Next, the flow of manufacturing the internal combustion engine 1 of the embodiment will be described. First, a bearing cap 4 in which the second bolt holes 43a are not formed in the second bosses 43 is formed. The frame 3 is formed so as to cast the bearing cap 4 in the frame 3, with the first bolt holes 44a closed with closing members, such as pins. Thus, the frame 3 and the bearing cap 4 are integrally formed.

Here, the surface of the frame 3 on the Z-axis plus side and the surface of the bearing cap 4 on the Z-axis plus side are disposed substantially flush with each other. Ends of the first bolt holes 44a on the Z-axis plus side are exposed from the surface of the frame 3 on the Z-axis plus side, and ends of the first bolt holes 44a on the Z-axis minus side are exposed from a surface of the frame 3 on the Z-axis minus side.

Next, second bolt holes 43a are formed in the second bosses 43 of the bearing cap 4. Then, the closing members closing the first bolt holes 44a are removed, and the frame 3 and the bearing cap 4 are fixed to the cylinder block 2 by the bolts 7 inserted into the first bolt holes 44a of the bearing cap 4 such that the surface of the cylinder block 2 on the Z-axis minus side and the surface of frame 3 and the bearing cap 4 on the Z-axis plus side substantially come into surface-to-surface contact with each other. At this point, the crankshaft 5 is disposed in the space formed by the concave part 22 of the cylinder block 2 and the concave part 41 of the bearing cap 4.

Next, the balancer housing 62, i.e., the balancer 6 is fixed to the second bosses 43 of the bearing cap 4 by the bolts 9 inserted into bolt holes 62a (see FIG. 1) that are formed in the balancer housing 62 such that the surface of the bearing cap 4 on the Z-axis minus side and the surface of the balancer housing 62 on the Z-axis plus side substantially come into surface-to-surface contact with each other. Then, the crank case and the oil pan (not shown) are fixed to the frame 3, which completes manufacturing of the internal combustion engine 1.

Since at least the second bosses 43 have higher rigidity than the frame 3, the bearing cap 4 has a lower likelihood of the bolts 9 loosening or the second bosses 43 cracking when the bolts 9 are fastened to the second bolt holes 43a. Moreover, the bearing cap 4 is fixed to the cylinder block 2 that has higher rigidity than the frame 3. Therefore, the bearing cap 4 and the internal combustion engine 1 of the embodiment can securely support the balancer housing 62.

Furthermore, the second bolt holes 43a are disposed outward of the first bolt holes 44a in the Y-axis direction, at such positions as not to overlap with the concave part 41 as seen from the Z-axis direction. Thus, the height of the bearing cap 4 in the Z-axis direction can be kept down. This can contribute to reducing the size of the internal combustion engine 1.

The bearing cap 4 preferably has the following configuration. To increase the area of contact with the surface of the cylinder block 2 on the Z-axis minus side, for example, the surfaces of the first bosses 44 on the Z-axis plus side may be increased as much as limiting conditions, including the shape of the frame 3, permit. Thus, stress concentration on the surfaces of the first bosses 44 on the Z-axis plus side is reduced, so that the surfaces of the first bosses 44 on the Z-axis plus side are less likely to undergo fretting.

Since the second bolt holes 43a should have at least a length that allows the balancer housing 62 to be fixed by the bolts 9, the length of the second bolt holes 43a in the Z-axis direction may be shorter than the length of the first bolt holes 44a in the Z-axis direction. In other words, the length of the second bosses 43 in the Z-axis direction may be shorter than the length of the first bosses 44 in the Z-axis direction.

Thus, the size and weight of the bearing cap 4 can be reduced. Moreover, aluminum material enters a space on the Z-axis plus side of the second bosses 43 during casting of the bearing cap 4 in the frame 3, so that the bearing cap 4 can be firmly cast in the frame 3.

It is preferable that first recesses 45 be formed between the first boss 44 and the second boss 43 as shown in FIG. 3 and FIG. 6. The first recesses 45 are depressed toward an inside of the bearing cap 4 in the X-axis direction. The first recesses 45 are disposed so as to face each other in the X-axis direction. Aluminum material enters the first recesses 45 during casting of the bearing cap 4 in the frame 3, so that the bearing cap 4 can be restrained from moving in the X-axis direction and the Y-axis direction relatively to the frame 3.

It is preferable that second recesses 46 be formed in a lateral end portion of the first boss 44 (i.e., an end portion on an X-axis plus side or an end portion on an X-axis minus side) as shown in FIG. 3 and FIG. 5. The second recesses 46 are formed by cutting off a part of the lateral end portion of the first boss 44 from the Y-axis direction such that a part of the lateral end portion of the first boss 44 is depressed in the X-axis direction. The second recesses 46 are disposed so as to face each other in the X-axis direction. Aluminum material enters the second recesses 46 during casting of the bearing cap 4 in the frame 3, so that the bearing cap 4 can be restrained from moving in the X-axis direction, the Y-axis direction, and the Z-axis direction relatively to the frame 3.

It is preferable that a third recess 47 be formed in a surface of the bearing cap main body 42 on the Z-axis minus side as shown in FIG. 3 and FIG. 6. The third recess 47 is formed by cutting off an end portion of the bearing cap main body 42 on the Z-axis minus side such that a part of the surface of the bearing cap main body 42 on the Z-axis minus side between the first bolt holes 44a is depressed toward the Z-axis plus side. Surfaces of the third recess 47 on the X-axis plus side and the X-axis minus side have first protrusions 47a that protrude toward an inside of the third recess 47 in the Y-axis direction. The first protrusions 47a have, for example, curved surfaces.

A surface of the third recess 47 on the Z-axis plus side has a second protrusion 47b that protrudes toward the Z-axis minus side. The thickness of the second protrusion 47b in the X-axis direction is smaller than the thickness of the first bosses 44 in the X-axis direction. A portion of the second protrusion 47b on the Z-axis minus side is formed by a three-dimensional curved surface such that the thickness in the X-axis direction decreases both toward the center of the second protrusion 47b in the Y-axis direction and toward the Z-axis minus side.

The second protrusion 47b is disposed roughly at the center of the bearing cap main body 42 in the X-axis direction and extends across the first bosses 44. Aluminum material enters the third recess 47 during casting of the bearing cap 4 in the frame 3, so that the bearing cap 4 can be restrained from moving in the X-axis direction, the Y-axis direction, and a Z-axis minus direction relatively to the frame 3.

It is preferable that a protrusion 48 be formed on each side surface of the first boss 44 as shown in FIG. 3 and FIG. 4. The protrusion 48 protrudes outward in the Y-axis direction from the side surface of the first boss 44. The protrusion 48 is formed by a three-dimensional sloping surface that tapers as it protrudes outward in the Y-axis direction from the side surface of the first boss 44 as seen from the Z-axis direction, and that slopes inward in the Y-axis direction as it extends outward in the X-axis direction from the center of the first boss 44 in the X-axis direction. The protrusion 48 digs into the frame 3 during casting of the bearing cap 4 in the frame 3, so that the bearing cap 4 can be restrained from moving in the X-axis direction, the Y-axis direction, and a Z-axis plus direction relatively to the frame 3. Moreover, stress concentration on the frame 3 is less likely to occur when the bearing cap 4 is cast in the frame 3.

Thus forming the first recesses 45, the second recesses 46, the third recess 47, and the protrusions 48 in the bearing cap 4 can restrain the bearing cap 4 from moving in the X-axis direction, the Y-axis direction, and the Z-axis direction relatively to the frame 3.

It is preferable that the side surface of the first boss 44 and the surface of the second boss 43 on the Z-axis plus side be connected to each other by a curved surface. Thus, stress concentration on the connecting part between the side surface of the first boss 44 and the surface of the second boss 43 on the Z-axis plus side is less likely to occur during casting of the bearing cap 4 in the frame 3.

This disclosure is not limited to the above embodiment but can be changed as necessary within the scope of the gist of the disclosure.

For example, in the above embodiment, the surfaces of the second bosses 43 on the Z-axis minus side are disposed substantially flush with the surfaces of the first bosses 44 on the Z-axis minus side. Alternatively, the surfaces of the second bosses 43 on the Z-axis minus side may be disposed on the Z-axis plus side relatively to the surfaces of the first bosses 44 on the Z-axis minus side. Thus, aluminum material can be poured also into portions on the Z-axis minus side of the second bosses 43 during casting of the bearing cap 4 in the frame 3. As a result, the area of contact between the bearing cap 4 and the aluminum material can be increased, which, for example, can strengthen the bond between the aluminum frame 3 and the metal bearing cap 4.

In this case, bolt holes through which the bolts 9 are passed can be formed in the frame 3 so as to communicate with the second bolt holes 43a of the second bosses 43. In the above embodiment, the surface of the bearing cap 4 on the Z-axis minus side is substantially in surface-to-surface contact with the surface of the balancer housing 62 on the Z-axis plus side. Thus, aluminum material composing the frame 3 is interposed between the surface of the bearing cap 4 on the Z-axis minus side and the surface of the balancer housing 62 on the Z-axis plus side.

Similarly, in the embodiment, the surface of the bearing cap 4 on the Z-axis plus side is substantially in surface-to-surface contact with the surface of the cylinder block 2 on the Z-axis minus side. Alternatively, aluminum material composing the frame 3 may be interposed between the surface of the bearing cap 4 on the Z-axis plus side and the surface of the cylinder block 2 on the Z-axis minus side. In this case, bolt holes through which the bolts 7 are passed can be formed in the frame 3 so as to communicate with the first bolt holes 44a of the first bosses 44.

In the embodiment, the first recesses 45, the second recesses 46, the third recess 47, and the protrusions 48 are formed in the bearing cap 4 to restrain the bearing cap 4 from moving in the X-axis direction, the Y-axis direction, and the Z-axis direction relatively to the frame 3. The shapes and arrangements of the recesses and the protrusions are not limited, as long as the bearing cap 4 can be restrained from moving relatively to the frame 3.

In the embodiment, for example, the second bolt holes 43a are formed after the bearing cap 4 is cast in the frame 3, but instead the bearing cap 4 may be cast in the frame 3 after the second bolt holes 43a are formed in the bearing cap 4. In the embodiment, the bearing cap 4 is cast in the frame 3 after the first bolt holes 44a are formed in the bearing cap 4, but instead the first bolt holes 44a may be formed after the bearing cap 4 is cast in the frame 3.

In the embodiment, for example, the frame 3 and the bearing cap 4 are fixed to the cylinder block 2 by the bolts 7, but the member to which the frame 3 and the bearing cap 4 are fixed is not limited to the cylinder block 2 and may be any member of the internal combustion engine 1. In the embodiment, the balancer housing 62 is fixed to the frame 3 and the bearing cap 4 by the bolts 9, but the member fixed to the frame 3 and the bearing cap 4 is not limited to the balancer housing 62 and may be any member of the internal combustion engine 1.

What is claimed is:

1. A bearing cap that is cast in a frame of an internal combustion engine, the bearing cap comprising:
   a concave part that supports a crankshaft of the internal combustion engine;
      a pair of first bosses that are disposed one on each side of the concave part so as to flank the concave part and each have a first bolt hole; and
      a pair of second bosses that are disposed one on each side of a bearing cap main body having the concave part and the pair of first bosses so as to flank the bearing cap main body and each have a second bolt hole, wherein:
   the bearing cap is fixed to a first member of the internal combustion engine by first bolts inserted into the first bolt holes, and to a second member of the internal combustion engine by second bolts inserted into the second bolt holes;
   the second member is a balancer housing of the internal combustion engine;
   at least the pair of second bosses have higher rigidity than the frame; and
   the first bolt holes have a longer axial length than the second bolt holes.

2. The bearing cap according to claim 1, wherein:
   the first member is a cylinder block of the internal combustion engine.

3. The bearing cap according to claim 1, wherein the first bosses have a longer axial length than the second bosses.

4. An internal combustion engine, comprising a first member, a second member, a frame, a crankshaft, and a bearing cap that is cast in the frame and supports the crankshaft, wherein
   the bearing cap includes:
      a concave part that supports the crankshaft;
      a pair of first bosses that are disposed one on each side of the concave part so as to flank the concave part and each have a first bolt hole; and
      a pair of second bosses that are disposed one on each side of a bearing cap main body having the concave part and the pair of first bosses so as to flank the bearing cap main body and each have a second bolt hole;
   the bearing cap is fixed to the first member of the internal combustion engine by first bolts inserted into the first bolt holes, and to the second member of the internal combustion engine by second bolts inserted into the second bolt holes;
   the first member has a further concave part having an arc shape corresponding to a circumferential shape of the crankshaft;
   at least the pair of second bosses have higher rigidity than the frame; and
   the first bolt holes have a longer axial length than the second bolt holes.

5. A manufacturing method of an internal combustion engine including a first member, a second member, a frame, a crankshaft, and a bearing cap that supports the crankshaft, the manufacturing method comprising:

casting, in the frame, the bearing cap including:
- a bearing cap main body having a concave part that supports the crankshaft and a pair of first bosses that are disposed one on each side of the concave part so as to flank the concave part; and
- a pair of second bosses that are disposed one on each side of the bearing cap main body so as to flank the bearing cap main body, at least the second bosses having higher rigidity than the frame;

fixing the bearing cap cast in the frame to the first member by first bolts inserted into first bolt holes that are formed in the first bosses of the bearing cap; and fixing the bearing cap cast in the frame to the second member by second bolts inserted into second bolt holes that are formed in the second bosses of the bearing cap, wherein the first bolt holes have a longer axial length than the second bolt holes, and the second bolt holes are blind holes.

6. The bearing cap according to claim 1, wherein the second bolt holes are blind holes.

7. The bearing cap according to claim 1, further comprising at least one of (i) first recesses, (ii) second recesses, or (iii) a third recess, wherein the first recesses are formed between each of the first bosses and an adjacent one of the second bosses, wherein
- the first recesses are depressed toward an inside of the bearing cap in a first direction parallel to a central axis of the crankshaft, and
- the first recesses are disposed so as to face each other in the first direction;

the second recesses are formed in a lateral end portion of each of the first bosses, wherein
- the second recesses correspond to a cut-off part at the lateral end portion of the first boss from a second direction, such that the lateral end portion of the first boss is depressed in the first direction, the second direction orthogonal to the first direction and a third direction, the third direction parallel to a central axis of a cylinder of a cylinder block of the internal combustion engine, and
- the second recesses are disposed so as to face each other in the first direction; and the third recess is formed in a surface of the bearing cap main body on a side opposite to the concave part in the third direction, wherein
- the third recess corresponds to a cut-off part at an end portion of the bearing cap main body on the side opposite to the concave part in the third direction, such that a part of the surface of the bearing cap main body between the first bolt holes is depressed in the third direction toward the concave part.

8. The bearing cap according to claim 7, wherein the bearing cap comprises the third recess, and at least one of (a) first protrusions or (b) a second protrusion;

the first protrusions are on opposite sides of the third recess in the first direction, and protrude toward an inside of the third recess in the second direction; and the second protrusion is disposed in a middle part of the bearing cap main body in the first direction, extends across the first bosses, and protrudes in the third direction away from the concave part, wherein

- a thickness of the second protrusion in the first direction is smaller than a thickness of the first bosses in the first direction; and
- the thickness of the second protrusion in the first direction decreases both (1) toward a center of the second protrusion in the second direction and (2) in the third direction away from the concave part.

9. The bearing cap according to claim 7, further comprising a protrusion formed on a side surface of each of the first bosses, wherein the protrusion protrudes outward in the second direction from the side surface of the first boss; and the protrusion is formed by a three-dimensional sloping surface which
- tapers while protruding outward in the second direction from the side surface of the first boss as seen from the third direction, and
- slopes inward in the second direction while extending outward in the first direction from the first boss in the first direction.

10. The bearing cap according to claim 1, wherein, on a side opposite to the concave part along an axial direction of the first bolt holes, surfaces of the second bosses are closer, along the axial direction, to the concave part than surfaces of the first bosses.

11. The internal combustion engine according to claim 4, wherein the second bolt holes are blind holes.

12. The internal combustion engine according to claim 4, wherein the bearing cap further comprises at least one of (i) first recesses, (ii) second recesses, or (iii) a third recess;

the first recesses are formed between each of the first bosses and an adjacent one of the second bosses, wherein
- the first recesses are depressed toward an inside of the bearing cap in a first direction parallel to a central axis of the crankshaft, and
- the first recesses are disposed so as to face each other in the first direction;

the second recesses are formed in a lateral end portion of each of the first bosses, wherein
- the second recesses correspond to a cut-off part at the lateral end portion of the first boss from a second direction, such that the lateral end portion of the first boss is depressed in the first direction, the second direction orthogonal to the first direction and a third direction, the third direction parallel to a central axis of a cylinder of a cylinder block of the internal combustion engine, and
- the second recesses are disposed so as to face each other in the first direction; and the third recess is formed in a surface of the bearing cap main body on a side opposite to the concave part in the third direction, wherein
- the third recess corresponds to a cut-off part at an end portion of the bearing cap main body on the side opposite to the concave part in the third direction, such that a part of the surface of the bearing cap main body between the first bolt holes is depressed in the third direction toward the concave part.

13. The internal combustion engine according to claim 12, wherein the bearing cap comprises the third recess, and at least one of (a) first protrusions or (b) a second protrusion;

the first protrusions are on opposite sides of the third recess in the first direction, and protrude toward an inside of the third recess in the second direction; and the second protrusion is disposed in a middle part of the bearing cap main body in the first direction, extends across the first bosses, and protrudes in the third direction away from the concave part, wherein
a thickness of the second protrusion in the first direction is smaller than a thickness of the first bosses in the first direction; and
the thickness of the second protrusion in the first direction decreases both (1) toward a center of the second protrusion in the second direction and (2) in the third direction away from the concave part.

14. The internal combustion engine according to claim 12, wherein
the bearing cap further comprises a protrusion formed on a side surface of each of the first bosses;
the protrusion protrudes outward in the second direction from the side surface of the first boss; and
the protrusion is formed by a three-dimensional sloping surface which
tapers while protruding outward in the second direction from the side surface of the first boss as seen from the third direction, and
slopes inward in the second direction while extending outward in the first direction from the first boss in the first direction.

15. The internal combustion engine according to claim 4, wherein, on a side opposite to the concave part along an axial direction of the first bolt holes, surfaces of the second bosses are closer, along the axial direction, to the concave part than surfaces of the first bosses.

16. The manufacturing method according to claim 5, wherein
the bearing cap further comprises at least one of (i) first recesses, (ii) second recesses, or (iii) a third recess;
the first recesses are formed between each of the first bosses and an adjacent one of the second bosses, wherein
the first recesses are depressed toward an inside of the bearing cap in a first direction parallel to a central axis of the crankshaft, and
the first recesses are disposed so as to face each other in the first direction;
the second recesses are formed in a lateral end portion of each of the first bosses, wherein
the second recesses correspond to a cut-off part at the lateral end portion of the first boss from a second direction, such that the lateral end portion of the first boss is depressed in the first direction, the second direction orthogonal to the first direction and a third direction, the third direction parallel to a central axis of a cylinder of a cylinder block of the internal combustion engine, and
the second recesses are disposed so as to face each other in the first direction; and
the third recess is formed in a surface of the bearing cap main body on a side opposite to the concave part in the third direction, wherein
the third recess corresponds to a cut-off part at an end portion of the bearing cap main body on the side opposite to the concave part in the third direction, such that a part of the surface of the bearing cap main body between the first bolt holes is depressed in the third direction toward the concave part.

17. The manufacturing method according to claim 16, wherein
the bearing cap comprises the third recess, and at least one of (a) first protrusions or (b) a second protrusion;
the first protrusions are on opposite sides of the third recess in the first direction, and protrude toward an inside of the third recess in the second direction; and
the second protrusion is disposed in a middle part of the bearing cap main body in the first direction, extends across the first bosses, and protrudes in the third direction away from the concave part, wherein
a thickness of the second protrusion in the first direction is smaller than a thickness of the first bosses in the first direction; and
the thickness of the second protrusion in the first direction decreases both (1) toward a center of the second protrusion in the second direction and (2) in the third direction away from the concave part.

18. The manufacturing method according to claim 16, wherein
the bearing cap further comprises a protrusion formed on a side surface of each of the first bosses;
the protrusion protrudes outward in the second direction from the side surface of the first boss; and
the protrusion is formed by a three-dimensional sloping surface which
tapers while protruding outward in the second direction from the side surface of the first boss as seen from the third direction, and
slopes inward in the second direction while extending outward in the first direction from the first boss in the first direction.

19. The manufacturing method according to claim 5, wherein, on a side opposite to the concave part along an axial direction of the first bolt holes, surfaces of the second bosses are closer, along the axial direction, to the concave part than surfaces of the first bosses.

20. The internal combustion engine according to claim 4, wherein
the bearing cap is arranged between heads of the first bolts and the first member.

21. The internal combustion engine according to claim 4, wherein
the second member is arranged between heads of the second bolts and the bearing cap.

* * * * *